(No Model.) 9 Sheets—Sheet 1.
W. H. WOOD & G. RICHMOND.
REFRIGERATING AND ICE MACHINE.

No. 268,347. Patented Nov. 28, 1882.

WITNESSES:

INVENTORS
William H Wood
George Richmond
BY Louis Bagger & Co
ATTORNEYS.

(No Model.)

W. H. WOOD & G. RICHMOND.
REFRIGERATING AND ICE MACHINE.

No. 268,347.

Patented Nov. 28, 1882.

WITNESSES:

INVENTORS
William H. Wood
George Richmond
BY Louis Bagger & Co.
ATTORNEYS.

(No Model.) 9 Sheets—Sheet 5.

W. H. WOOD & G. RICHMOND.
REFRIGERATING AND ICE MACHINE.

No. 268,347. Patented Nov. 28, 1882.

WITNESSES

INVENTORS
William H Wood
George Richmond
BY Louis Bagger & Co
ATTORNEYS (No Model.) 9 Sheets—Sheet 6.
W. H. WOOD & G. RICHMOND.
REFRIGERATING AND ICE MACHINE.
No. 268,347. Patented Nov. 28, 1882.

(No Model.) 9 Sheets—Sheet 7.
W. H. WOOD & G. RICHMOND.
REFRIGERATING AND ICE MACHINE.
No. 268,347. Patented Nov. 28, 1882.

WITNESSES

INVENTORS
William H. Wood
George Richmond
BY Louis Bagger & Co.
ATTORNEYS (No Model.) 9 Sheets—Sheet 8.
W. H. WOOD & G. RICHMOND.
REFRIGERATING AND ICE MACHINE.

No. 268,347. Patented Nov. 28, 1882.

WITNESSES:

INVENTOR
William H. Wood
George Richmond.
BY Louis Bagger & Co.
ATTORNEYS.

(No Model.)  9 Sheets—Sheet 9.
W. H. WOOD & G. RICHMOND.
REFRIGERATING AND ICE MACHINE.
No. 268,347.   Patented Nov. 28, 1882.

WITNESSES:   INVENTORS
             William H. Wood
             George Richmond
          BY Louis Bagger & Co.
             ATTORNEYS.

UNITED STATES PATENT OFFICE.

WILLIAM H. WOOD AND GEORGE RICHMOND, OF BROOKLYN, NEW YORK.

REFRIGERATING AND ICE MACHINE.

SPECIFICATION forming part of Letters Patent No. 268,347, dated November 28, 1882.

Application filed September 4, 1882. (No model.)

*To all whom it may concern:*

Be it known that we, WILLIAM H. WOOD and GEORGE RICHMOND, of Brooklyn, in the county of Kings and State of New York, have invented certain new and useful Improvements in Refrigerating and Ice Machines; and we do hereby declare that the following is a full, clear, and exact description of the invention, which will enable others skilled in the art to which it appertains to make and use the same, reference being had to the accompanying nine sheets of drawings, which form a part of this specification.

Our invention has relation to that class of ice-machines or refrigerating-machines in which cold is generated by the process of vaporization of ammonia, ether, benzole, &c., which, in assuming the vaporous form, change sensible heat to latent, extracting it from the objects most convenient thereto—such as water or brine—according to the purposes for which the machine is to be used—*i. e.*, as an ice-machine or machine for manufacturing ice, or as a refrigerating-machine for cooling the air of store-rooms, beer-vaults, the holds of steamships, &c. Our machine is adapted to either and all of these purposes; and our invention consists in an improved construction and combination of the main essentials to the complete machine. In this class of machines the chief elements or component parts are three—viz., a pump for pumping the ammonia or other liquid to be vaporized into the condensing apparatus, a condensing apparatus for liquefying the ammonia (ether or benzole) gas, and a refrigerating apparatus in which the cold generated by the condensation of the gas or vapor is utilized. To these should be added an engine for working the pump and such other parts of the machine as require motive power, and also certain accessories to the several parts, by which their operation is rendered more perfect.

Our improvements relate to the construction of all of these parts or elements of the complete machine, and to their combination, from which important advantages result over this class of machines as heretofore constructed. Among these advantages may be named the following: no difficulty in pumping the ammonia, no leakage, economy of room and labor, as well as of fuel and condensing water in operating the machine, continuity of operation, and facility for repairing and renewing such parts of the machine as require repair and renewal.

The nature of our improvement is fully illustrated on the accompanying nine sheets of drawings, in which—

Similar letters of reference indicate corresponding parts in all the figures.

Figure 1:
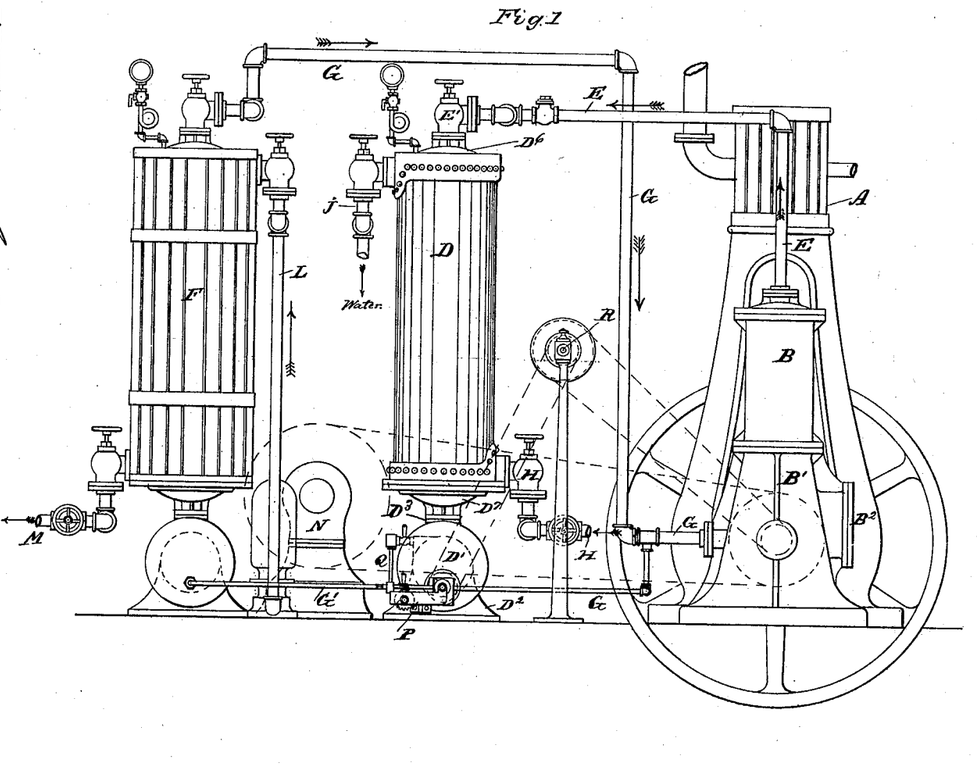
Figure 1 represents a side elevation of the complete machine.
Figure 2:
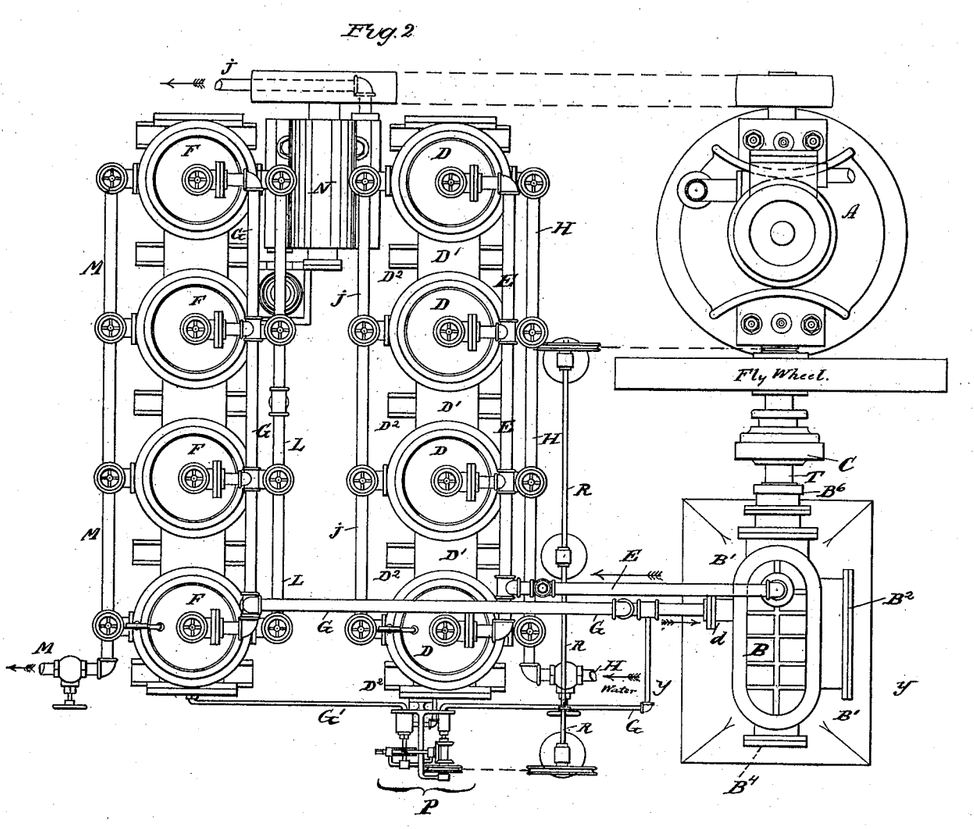
Fig. 2 is a plan of the same.

We shall first proceed to describe the general arrangement and combination of parts of the complete machine, and afterward, in their proper order, the detailed construction of said parts and their operation, reference being had during this part of the description to Figs. 1 and 2 of the drawings.

The letter A designates an engine of any suitable construction, the shaft of which is connected by a friction-coupling (shown at C) with the shaft of the pump, (shown at B.)

The letters D are the sectional condensers, four being shown in the present illustration of our invention.

E is the delivery-pipe by which the gas is taken from the pump and distributed among the condensers.

F F are the sectional refrigerators, and G is a suction-pipe, by which the gas is withdrawn from the refrigerator and fed back to the pump to be compressed.

A water-pipe (shown at H) feeds water to the condensers, and J is the water outlet or discharge pipe. The brine is fed to the refrigerator through the pipe shown at L, and is discharged through the pipe shown at M. All of these pipes are provided with suitably-constructed valves or stop-cocks in such a manner that communication of any one of the condensers or refrigerators with the rest of the apparatus may be shut off at will.

N is a pump for circulating the brine through the refrigerators; and P is the automatic device for supplying the liquid to the refrigerator. This device or apparatus may be driven by a counter-shaft (shown at R) and suitable band-pulleys which connect with the engine. The condensers are provided with a gage-glass, (shown at Q,) for the purpose of indicating the height of liquid in the condensers. This arrangement and combination of the several parts admits of a very powerful machine, constructed so as to occupy but comparatively little space. The friction-coupling shown at C, which connects the engine and the pump, will prevent accident in case of any undue strain being thrown upon the pump.

Figure 3:
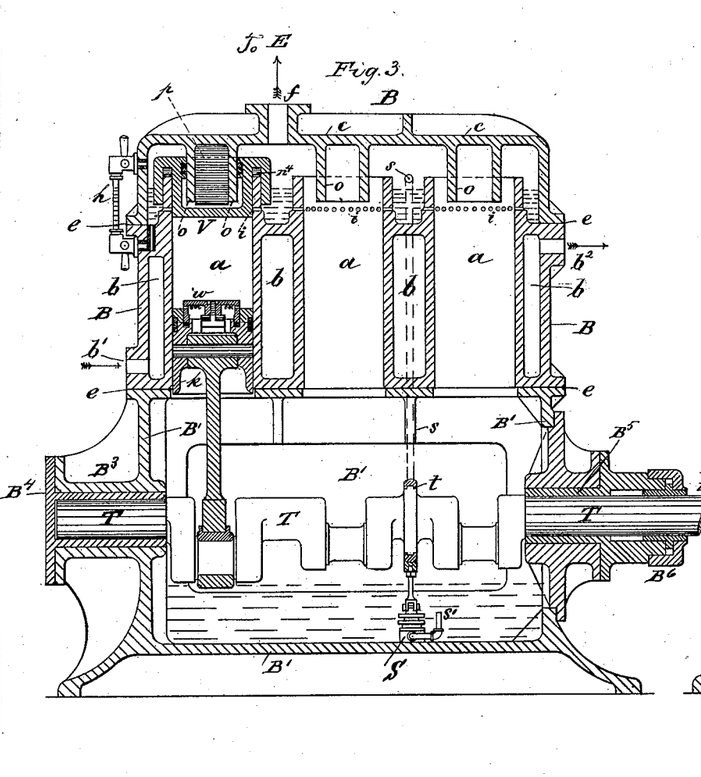
Fig. 3 is a longitudinal vertical section of the pump.
Figure 4:
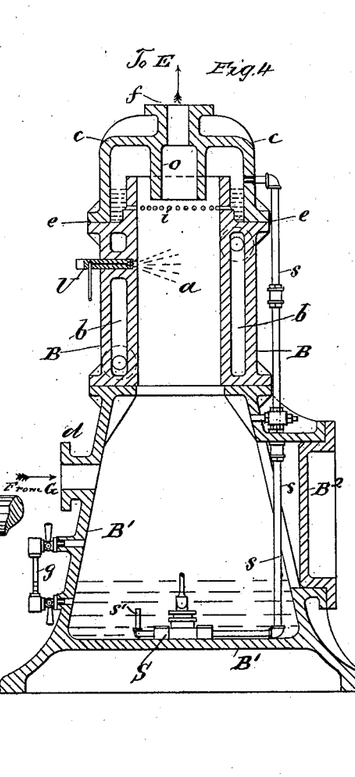
Fig. 4 is a transverse vertical section of the same.

In describing the construction of the pump reference should be had to the sectional views shown in Figs. 3 and 4 and to the several detail views on Sheets 4 and 5. The object of the construction of the pump as therein shown, and as we will now proceed to describe in detail, is to obviate the difficulties attending the compression of a liquefiable gas as used for the purposes of refrigeration. These difficulties are, among others, the escape of the gas through the glands and leakage at each end of the stroke of the piston. In our improved pump leakage or escape of the gas is impossible, lubrication is perfect, and the pump will work for any length of time without heating.

The pump consists essentially of two parts—viz., an upper casing (shown at B) and a lower casing, (shown at B'.) The upper casing consists of a series of three pump-cylinders, (shown at $a$,) which are separated from each other by open spaces or jackets, (shown at $b$.) The top casing, B, is made with top and bottom flanges, (shown at $e$,) a cap or cover (shown at $c$) being bolted to the top flange, while the bottom flange, $e$, is bolted to the top of the lower casing, B'. The open spaces or chambers $b$, which divide the several cylinders, communicate with each other, and have an inlet, $b'$, and an outlet, $b^2$, so that a stream of cold water may be fed through the chambers for the purpose of cooling the cylinders. Other means for effecting the same purpose may, however, be used, to which reference will be made hereinafter. Inserted through the lower casing, B', is the pump-shaft T, which has three cranks for operating a corresponding number of piston-rods. The casing B' is cast with a large opening on one side, which is closed by a cover, B², by removing which access may be had to the interior of that part of the machine for the purpose of cleaning it, or for other purposes. It also has a long hollow boss (shown at B³) for receiving the gland, (shown at B⁴,) into which the end of shaft T is inserted, as clearly shown in Fig. 3, so that escape of the gas on that side of the machine is impossible. At the other end of the casing is an opening, B⁵, through which shaft T passes, a gland (shown at B⁶) being used for the purpose of compressing the packing placed in the boss or stuffing-box around the shaft, and thus effectually prevent leakage also on that side. This part of the machine is illustrated on a larger scale in Fig. 11 of the drawings.

Figure 12:
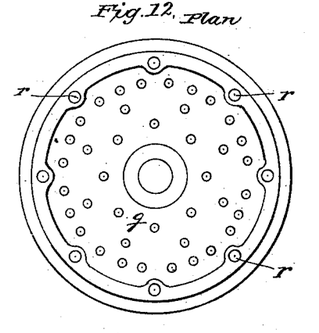
Figs. 12, 13, and 14 are details of the pump piston or follower.
Figure 13:
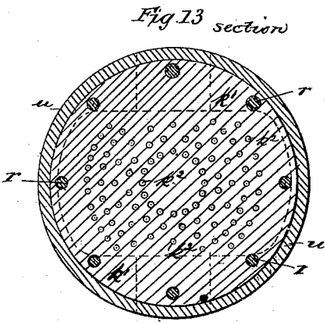
Figure 14:
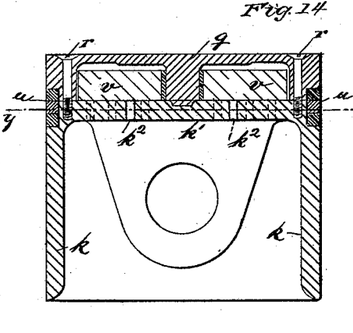

In Fig. 3 we have shown only one of the pistons or followers; but it is obvious that each pump-cylinder should be provided with its appropriate follower and appurtenances. The construction of the follower is shown in detail on Sheet 5 of the drawings, on which we have shown two different modes of construction, either one of which may be used. Fig. 14 represents a vertical sectional view of the follower. Fig. 13 is a cross-section of the same through the line $y\,y$ in Fig. 14, and Fig. 12 is a plan or top view. The body of the piston-head or follower consists of a cylindrical casing, $k$, closed at the top by a plate, $k'$, which has a number of fine apertures or perforations, $k^2$. Upon this top plate is fastened a cylindrical head or casing, $q$, which is held in place by screws $r$, metallic packing-rings $u$ being clamped between the parts $q$ and $k$, so as to provide for a perfect fit of the follower within its appropriate cylinder. The top plate, $q$, is also perforated, as shown in Fig. 12, and in the space between the perforated plates $q$ and $k$ is placed a circular valve, (shown at $v$,) which has a limited play up and down around the central stem or bushing which connects plates $q$ and $k$.

Figure 15:
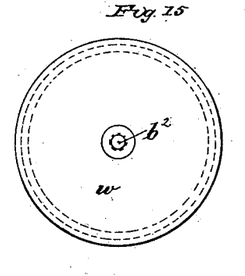
Figs. 15, 16, and 17 are similar views, showing a different construction of the piston or follower.
Figure 16:
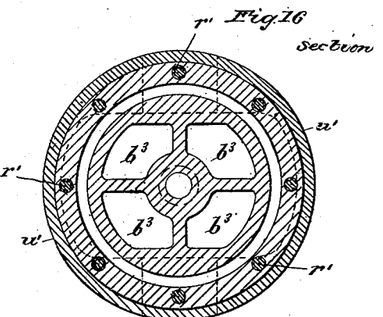
Figure 17:
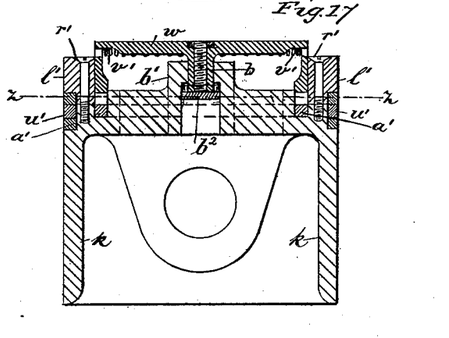

The piston or follower shown in Fig. 17 is of a somewhat different construction, but operates in substantially the same manner. Fig. 16 represents a cross-section through line $z\,z$ in Fig. 17, and Fig. 15 is a plan or top view of the valve. By reference to these three figures it will be seen that the follower consists of a cylindrical head, $k$, the top of which forms a plate which is cored out to form large openings $b^3$. A ring or annulus, $l'$, is secured upon the upper rim of the follower-head by screws $r'$, and serves to compress packing-rings $u'$, by which a close fit of the follower in its appropriate pump-cylinder is obtained. The valve shown at $w$ consists of a cylindrical cap fitting within the annulus $l'$, and having series of apertures $v'$ encircling it just under the top. It has a central flanged stem, $b$, which works in a central bushing or collar, $b'$, and when the valve is in its down position on the upstroke of the follower its annular lower rim will bear against a rubber packing-ring, (shown at $a'$,) which takes up the jar and insures the easy operation of the valve.

The gas to be compressed is admitted into the lower casing, B', through the inlet $d$, and on the downstroke of the several pistons or followers passes through their respective valves up into the top parts of their respective pump-cylinders $a$.

The operation of the valve shown in Fig. 14 will readily be understood. On its downstroke the gas, entering the apertures $k^2$, will lift the valve $v$ up against the perforated fixed top plate, $q$, and enter the valve-chamber; but on the upstroke of the piston the pressure will force valve $v$ down upon its seat $k'$, thus closing the apertures $k^2$, and force the gas through the perforated top plate, $q$, up into the top part of the cylinder. The valve of the follower illustrated in Figs. 15, 16, and 17 operates in substantially the same manner. On the downstroke the gas will enter the valve-chamber $w$ through the apertures $b^3$, thus lifting the valve from its seat; but on the upstroke the pressure will force the valve down upon its rubber annulus or seat $a'$, the gas, which on the downstroke escaped through the annular series of apertures $v'$ in the valve-chamber, now being forced with considerable pressure up into the top parts of the appropriate pump-cylinders.

Figure 5:
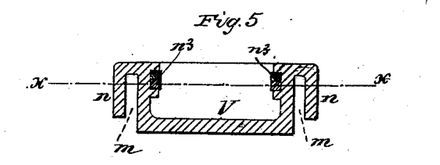
Fig. 5 is a sectional detail view of the pump-cylinder valve.
Figure 6:
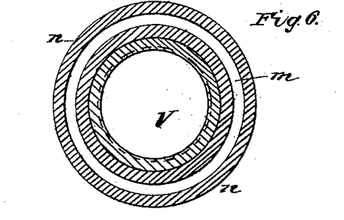
Fig. 6 is a cross-section of the same through line $xx$ in Fig. 5.
Figure 7:
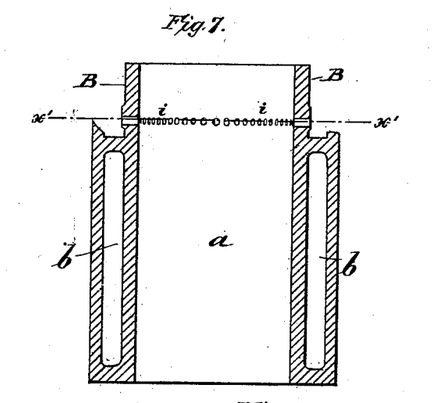
Fig. 7 is a sectional detail view, on an enlarged scale, of one of the pump-cylinders.
Figures 8, 9, 10, 11:
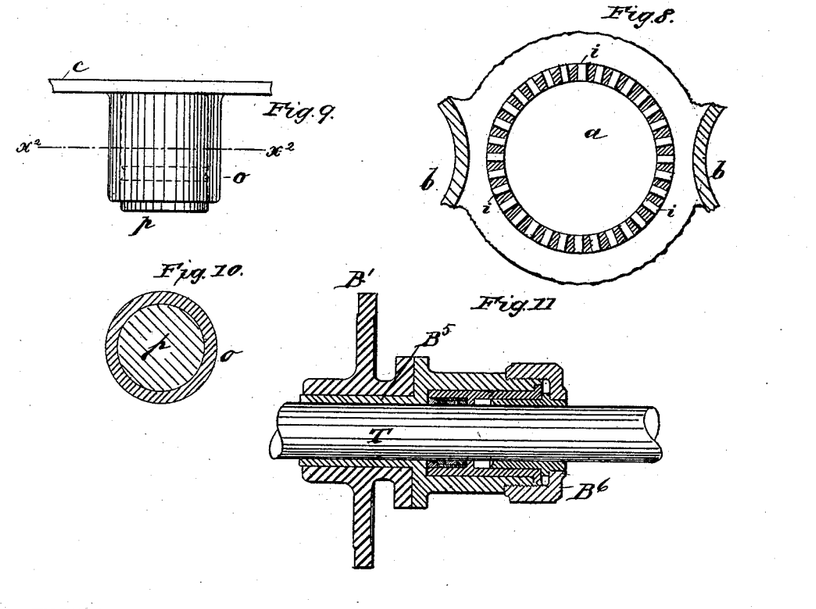
Fig. 8 is a cross-section of the same through line $x'x'$ in Fig. 7.
Fig. 9 is a detail view of the rubber buffer and its collar, which regulates the play of the cylinder-valve.
Fig. 10 is a cross-section of the same through line $x^2 x^2$ in Fig. 9.
Fig. 11 is a detail view of the pump-shaft bearing or bushing.

The cap or cover $c$, which is bolted to the upper casing, B, by its flange $e$, has a series of downwardly-projecting cylindrical pockets, (shown at $o$)—one for each of the several pump-cylinders—into the top part of which it projects down some distance, as clearly shown in Figs. 3 and 4. Into each of these pockets is inserted an elastic buffer or cushion, $p$, which projects with its lower end a short distance below its appropriate cylindrical pocket or collar. In the annular space between said pockets and the upper part of their appropriate cylinders works a valve, (shown at V in Fig. 3, and in Fig. 5, on Sheet 4, on an enlarged scale,) Fig. 5 being a diametrical section of said valve; Fig. 6, a horizontal section through line $x\ x$ in Fig. 5; Fig. 7, a vertical sectional view of the pump-cylinder with the valve removed therefrom; Fig. 8, a horizontal section of the same through line $x'\ x'$; Fig. 9, a side view of the rubber buffer and its pocket, and Fig. 10 a cross-section of the same through line $x^2\ x^2$ in Fig. 9. From Figs. 5 and 6 it will be seen that the discharge-valve V, of which there is one for each of the pump-cylinders, is accurately bored out to form an annular space, $m$, which will fit over the top part of the cylinder. The annular flange $n$, formed by the annular bore $m$, encircles the central body, V, of the valve, which projects down a sufficient distance to cover a series of apertures, $i$, made in the top part of the pump-cylinders, when valve $v$ is in its down position, on the downstroke of the follower; and in order to insure a perfect working of the valve, it is provided on its inside with packing-rings $n^2$, which encircle and bear against the downwardly-projecting pocket $o$; and a packing-ring (shown at $n^4$, Fig. 3) is placed in the top part of the annulus $m$, so as to bear against the top rim of the cylinder.

In the bottom of the lower casing, B', in which the crank-shaft works, is placed a suitable quantity of some liquid or fluid which is not acted on by the gas to be compressed. This liquid should stand at a level sufficiently high for lubrication of the crank-pins as these revolve and are dipped into it, a gage-glass, $g$, being provided for the purpose of inspecting the level of the lubricating-liquid. The upper chamber, B, also contains a suitable quantity of the same liquid, the height or level of which is indicated by the gage-glass $h$. By reference to Figs. 3 and 4 it will be seen that this liquid covers the apertures $i$ in the several pump-cylinders, but is prevented from entering the cylinders by the closing of the holes $i$ by the valve V, when this is in its down position, on the downstroke of the follower. In this manner the liquid which envelops the perforated top parts of the pump-cylinders serves as a seal, which will effectually prevent the gas from returning through apertures $i$ into the pump-cylinders, for it will be observed that on the upstroke of the follower the valve V is lifted off its seat by the pressure of the gas until it strikes the projecting lower end of the buffer $p$, thus opening the apertures $i$, through which the gas escapes by bubbling through the surrounding liquid up into the top part of the casing B, from which it is discharged through the opening $f$ into the delivery-pipe E, which feeds it to the condensing apparatus. A portion of the liquid contained in the top part of the casing will at each stroke of the several pistons trickle through the apertures $i$ into the cylinders, where it serves as a lubricant and seal for the followers; and as in this manner the liquid in that part of the casing is gradually exhausted by flowing down into the cylinders $a$ and through the follower-valves into the bottom part, B', of the casing, it is replenished by means of a small pump, S, worked by an eccentric, $t$, upon the crank-shaft T, the liquid being drawn into the pump through the tube $s'$ and discharged up into the top part of the pump through the pipe shown at $s$.

It is of utmost importance that proper means should be provided for cooling the pump-cylinders; and this may be accomplished by means of the cooling-chambers or water-jackets $b$, in the manner already described, or by the means which we shall now proceed to describe, both having for their objects to provide adequate means for dissipating the heat generated in compressing a liquefiable gas.

When a gas is compressed the temperature rapidly rises and the pressure reaches the maximum more rapidly than it would do if due to change of volume alone. The piston therefore has to move through a farther space against the maximum pressure than it otherwise would do. The curve representing the energy expended is in this case termed an "adiabatic" or "isentropic" curve, as distinguished from the "isothermal" curve representing the energy expended when the compression takes place at a constant temperature.

It is clear on general principles, and it is capable of rigid mathematical demonstration, that the energy exerted in the compression of the gas according to the adiabatic curve is greater than that required for isothermal compression. Moreover, the practical disadvantages which result from heating of the machinery are very great, among which may be mentioned the increase of friction and the difficulty of delicate adjustment of the co-operating parts, owing to unequal expansion and contraction; also, and not least, the gradual drying of the lubricating and packing material and the loss of effect by expansion of the gas in its flow through hot passages and contact with heated cylinders and pistons before the process of compression actually begins.

We have found by experience that water-jackets providing for a flow of cold water around the exterior of the cylinder are only a partial remedy where the pump is worked at considerable speed; and hence we have devised the apparatus, which we shall now proceed to describe, for causing the effectual and rapid cooling of the pump-cylinders, regardless of the speed at which the pumps may be worked.

This part of our invention consists in the construction of an appliance for injecting a small amount of liquid (the gas or vapor of which is under compression) in a finely-divided state into the cylinder, the gas entering the same as a saturated vapor at a certain pressure, which will depend upon the temperature of the refrigerator. If the gas is compressed in the ordinary way and without means for cooling the compressing-cylinders, it rapidly assumes the character of highly-superheated gas; but if during the operation of compression just so much liquid is injected as is sufficient, by its vaporization, to dissipate the generated heat, the gas will remain in the form of saturated vapor all the time, and the temperature will remain constant. The compression will be effected with less expenditure of energy; and, inasmuch as the injected liquid passes into the condenser as a saturated vapor, there is no loss in the effective capacity of the cylinder. As an illustration of this principle, take, for example, the case of ammonia, assuming that the temperature in the refrigerator is 0 degrees Fahrenheit and in the condenser a temperature of 80° Fahrenheit. At a temperature of 80° the ammonia liquefies under a pressure of one hundred and fifty-two pounds to the square inch, while the pressure at zero is about thirty pounds to the square inch; and it may be calculated mathematically that in compressing ammonia from thirty pounds to one hundred and fifty-two pounds per square inch the temperature will rise to 273° Fahrenheit. If the temperature in the cylinder is not to exceed 90°, we have to inject sufficient liquid ammonia to dissipate the heat represented by a change of temperature from 90° to 273°. Assuming that the specific heat of ammonia is 0.3, the heat required to raise one pound of ammonia-gas from 90° to 273° is fifty-five thermal units. The latent heat of ammonia being about five hundred and fifty thermal units, it is evident that, under the circumstances of the example, about ten per cent. of the amount of ammonia in the cylinder must be injected at each stroke of the piston or follower. This represents about one seven-hundredth of the capacity of the cylinder, the relative volume of gas and liquid ammonia at 90° being seventy. The only difference, so far as the condenser is concerned, is that the same quantity of heat has to be removed from a larger mass of saturated vapor of comparatively low temperature as was previously removed from a smaller mass of gas or vapor in highly-superheated state.

Figure 25:
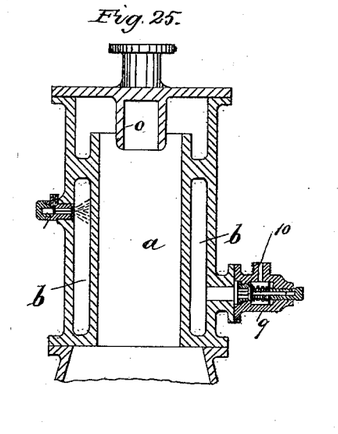
Figs. 25, 26, and 27 are sectional detail views of modifications of the apparatus for cooling the pump-cylinders.
Figure 26:
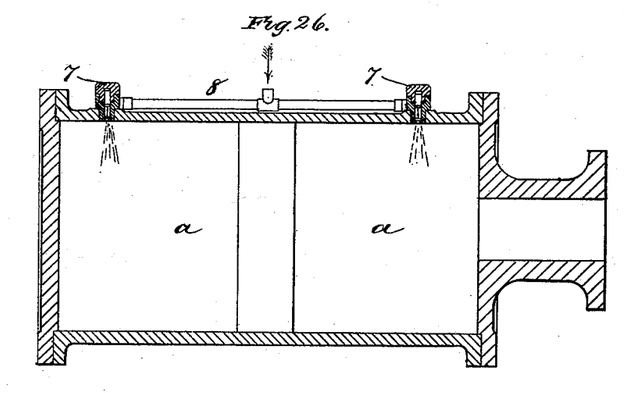
Figure 27:
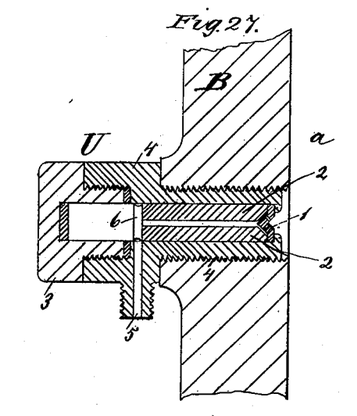

The means adopted by us for carrying out this part of our invention are illustrated in Figs. 25, 26, and 27 on Sheet 6 of the drawings, and on a small scale, in one of its forms or modifications, at U in Fig. 4, the enlarged view shown in Fig. 27 being the same as shown on a smaller scale in Fig. 4.

Reference being had to Fig. 27, in which the letter B represents the casing or wall of the pump-cylinder, the numeral 1 represents a disk of hard metal, in which two small holes are drilled at about right angles to each other in such a manner that two minute streams of liquid flowing through them will impinge on each other and by their contact break up into a fine spray or minute mist. This disk is inserted at the inner end of a barrel, 4, which is screwed into a threaded bore in the wall of the cylinder, and is held in place by a cylindrical plug, (shown at 2,) which in turn is held in place by a screw-cap, (shown at 3.) The rear end of the plug 2 has a channel, (shown at 6,) which communicates with the central bore or channel, which passes through the plug longitudinally to the perforated disk 1, at its inner end. The liquid ammonia, to be injected in the form of spray into the cylinder, is fed through a channel or inlet, 5, in the barrel 2, which communicates with the channel 6 at the end of plug 2. This construction permits of the easy taking apart of the several parts of the injector for repair or cleaning when desired, or for the purpose of changing the spraying-disk at the inner end of the device when it is desired to change the character of the spray.

In Fig. 26 two injector-nozzles are employed, (shown at 7 and 7,) which are connected by a common feed-pipe, 8. These nozzles, as shown by the drawings, are not placed in close proximity to the ends of the cylinder, nor yet so far from them as to allow of the injection of spray on the under side of the piston.

The action of this apparatus is as follows: A nozzle of the proper capacity having been selected—that is, with holes fine enough to produce spray of the requisite fineness to supply the ammonia in the exact quantity required for the existing conditions of work—one of the nozzles is spraying into the cylinder during the descent of the piston toward it, and continues to do so until the pressure in the cylinder equals that in the condenser. The effect of the spray during the inflow of gas into the cylinder is to supersaturate it; and for this purpose, and to obtain the most satisfactory results, it is important that the injected liquid should be in the form of a fine spray or mist offering a large surface; otherwise, when the pump is working rapidly the injected liquid would not be completely vaporized and only partially attain the desired result.

In Fig. 25 we have shown yet another modification of the injecting device, which will be found useful in special cases or under peculiar conditions, where the more effective methods described above are difficult of application. This last plan consists practically in converting the cylinder-jacket $b$ into a refrigerator, a spray-injector nozzle being inserted into one side of the jacket, the opposite side of which is provided with a relief-valve, (shown at 9,) which is so constructed that it will allow the expanded gas in the jacket to escape at a given fixed pressure, corresponding to the degree of temperature which it is desired to maintain in the jacket. The overflow through this relief-valve passes through its outlet 10 into the suction-pipe leading to the pump, where the expanded gas meets and mixes with the gas from the refrigerator.

In describing the general arrangement of our machine as illustrated in Figs. 1 and 2 of the drawings we have termed the apparatus shown at D the "condensers," and that shown at F the "refrigerators." These terms, however, do not relate to the construction of these devices, both being constructed alike, but to the purposes to which they are put. We shall therefore describe in detail only the construction of the so-called "condensers," from which the construction of the so-called "refrigerators" will be readily understood without a duplicate description. Prior to describing this construction, however, it is well to observe that in refrigerating machinery it is a matter of the utmost importance that it should act continuously, and not be liable to stoppage, which is apt to entail considerable loss. However well a machine or the component parts of a machine may be constructed in the first instance, there must always be a liability to defects and flaws and an absolute certainty of eventual failure to perform satisfactorily. As most of the machines at present in use are constructed, it is impossible to find the exact locality of a flaw without a lengthened and tedious examination of the whole apparatus, and to repair the flaw when found requires that the whole machine must be stopped, and often quite a large portion thereof removed.

The object of this part of our invention is to construct a condenser or refrigerator, as the case may be, which is built up of a number of parts, each of simple construction, and arranged in such a manner that each separate part or section of the complete condenser or refrigerating apparatus may be detached or isolated from the remaining section without stoppage of the machine. By this construction, which we shall now proceed to describe more fully, a break or flaw may readily be localized and repaired without stopping the continuous run of the machine.

Figure 18:
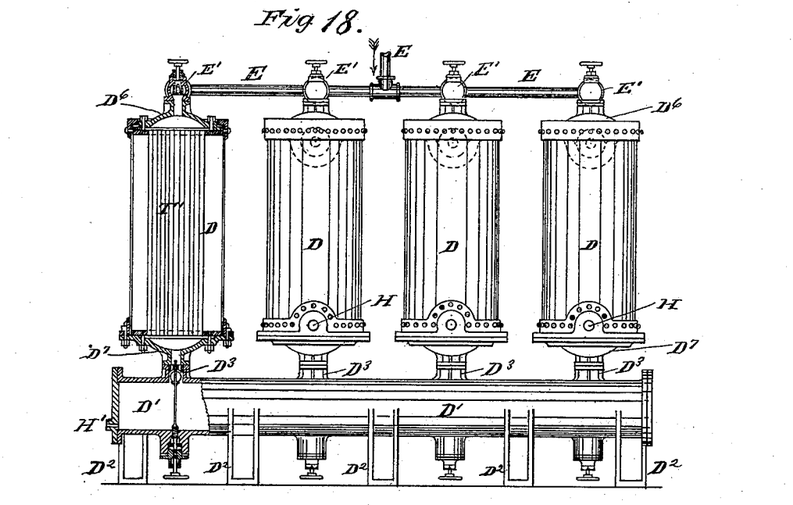
Fig. 18 is an elevation, partly in section, of the combined condensing and refrigerating apparatus.
Figures 19, 20:
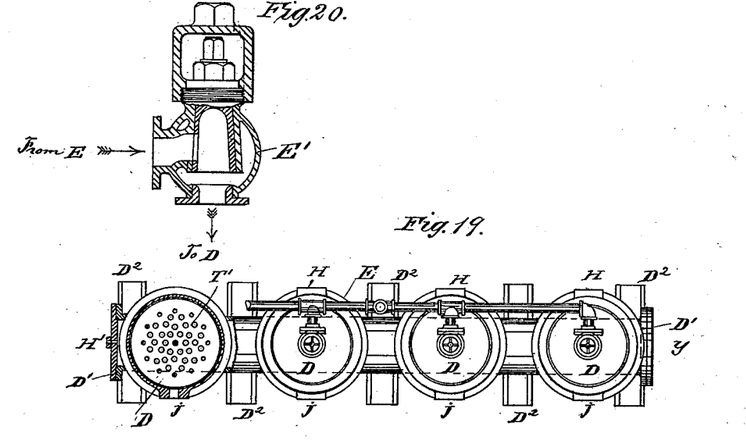
Fig. 19 is a plan view, with part shown in horizontal section, of the same.
Fig. 20 is an enlarged detail view of one of the valves or stop-cocks.
Figures 21, 24:
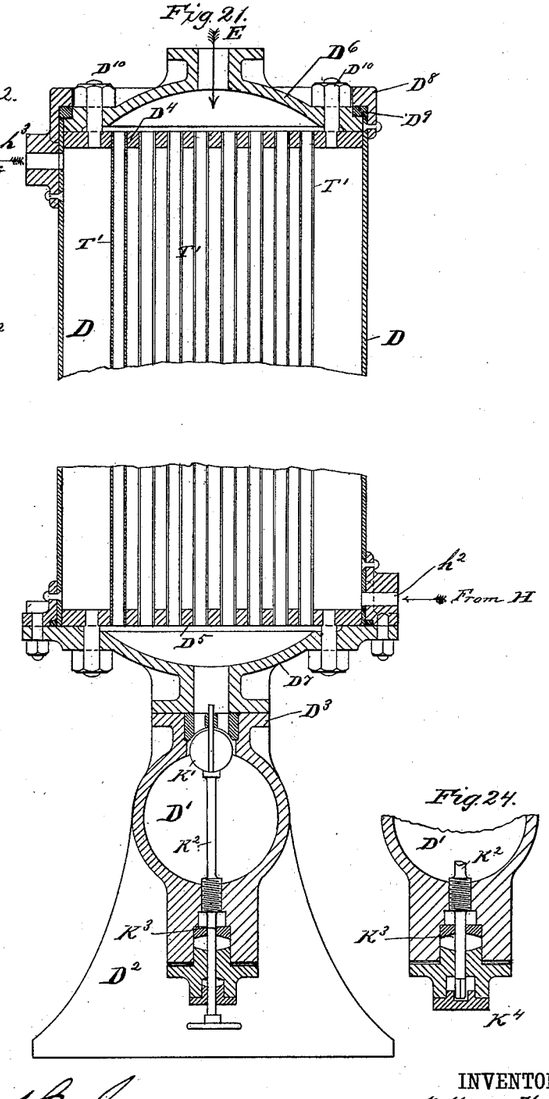
Fig. 21 is a vertical sectional view of the condensing apparatus.
Fig. 24 is a sectional detail view of the lower part of the condensing apparatus, with its valve, showing a modified construction of the latter.
Figure 22:
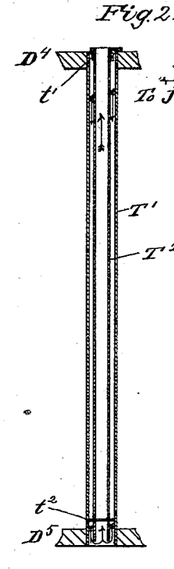
Fig. 22 is a detail view of one of the pipes of the same.
Figure 23:
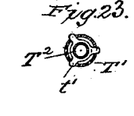
Fig. 23 is a cross-section through one of said pipes.

This part of our invention is illustrated in the following figures: Fig. 18 shows an elevation of the apparatus, partly in section. Fig. 19 represents a top or plan view of the same, one of the sections being shown in horizontal section. Fig. 20 is an enlarged sectional view of one of the stop-cocks or inlet-valves. Fig. 21 is a vertical sectional view of one of the sections of the apparatus, four of these sections being shown, both for the condensing and refrigerating apparatus, in the present illustration of our invention. Fig. 22 is a longitudinal sectional view of one of the gas-pipes of the apparatus. Fig. 23 is a cross-section of the same, and Fig. 24 is a sectional view, showing an alternative construction of the apparatus shown in Fig. 21.

The condenser or refrigerator, as the case may be, consists of a cylindrical body or casing, D, made of wrought-iron, which is built upon or connected to a collecting pipe or reservoir, (shown at D',) which connects the several parts or sections D, and is supported upon a suitable number of feet, $D^2$. This reservoir is constructed with flanged necks $D^3$, upon which the several sections of the condensers or refrigerators are bolted. For the purpose of convenience we shall in this part of our description refer to the several sections as condensers, although several of these sections go to make up the complete condensing or refrigerating apparatus as applied to our machine.

Each condenser D can be isolated from the others by means of the valve or stop-cock E', and in the case of the condensers D the distributing-pipe E delivers the gas to be liquefied from the pump. As the gas condenses in passing through the tubes within the apparatus it is collected as liquid ammonia in the collecting-reservoir D', from which it may be drawn off, to be again vaporized, through an outlet, H', at one end of the pipe, as shown in Figs. 18 and 20 on the drawings. This is done direct from apparatus D to the refrigerating apparatus shown at F through the pipe G'.

Referring to Fig. 21 of the drawings, it will be seen that each condenser or refrigerator, as the case may be, contains a series of straight tubes, T'. These tubes are fixed in the tube-plates $D^4$ and $D^5$ by means of tube-expanders and beaded over the top, so that each tube also virtually forms a stay-bolt for the apparatus. Inside of each of these tubes is a smaller tube, $T^2$, which is kept in a central position by means of top and bottom collars. (Shown at $t'$ and $t^2$.) The object of this inner tube is twofold. It promotes circulation of the gas over the tube-surface by dividing the column of gas into two columns of unequal temperature, and therefore of unequal density. It also forms a radiating-surface, increasing the action of the outer tube by radiating through the annulus of gas contained between the two tubes the heat imparted to it by the contact of the gas.

The top cover, $D^6$, of the cylindrical casing D is secured by screws or bolts $D^{10}$, in the manner hereinafter described, to the upper tube-plate, $D^4$, and the bottom $D^7$ is similarly fastened to the lower tube-plate, $D^5$. The top cover, $D^6$, is provided with a flanged inlet, by which the gas is introduced through the branched distributing-pipe E and its appropriate valve E'. Where this apparatus, however, is used as a refrigerator, as at F, the liquefied gas is introduced into the apparatus through the bottom and drawn off through the suction-pipe G at the top. In either case the bottom $D^7$, which forms a gas-chamber underneath the bottom tube-plate, $D^5$, has a central flanged outlet, (or inlet in the case of the refrigerator,) by means of which it is bolted upon its appropriate flanged neck of the reservoir D'.

The mode of securing the cover $D^6$ and bottom $D^7$ of the apparatus by which the upper and lower gas-chambers are formed will readily be understood by reference to Fig. 21 of the drawings, from which it will be seen that the flanged cover $D^6$ is held in place by nutted bolts $D^{10}$, a flanged ring or annulus, $D^8$, encircling the cover and pressing down upon a gasket or packing-ring, $D^9$. This construction admits of the ready removal of the top and bottom parts when it is desired to repair or inspect the interior of the apparatus.

Where this apparatus is used for the purpose of condensing the gas the cooling-water or water for condensation is supplied from a branched main pipe, H, through the inlet $h^2$, and after filling the space within the cylindrical casing D, surrounding the series of vertical tubes or gas-flues T', escapes at the top, directly below the upper tube-plate $D^4$, through an outlet, $h^3$, into the discharge-pipe J. In this connection we employ an apparatus for cooling the water of condensation, which may be employed with advantage in cases where water is scarce or where a flow of cold water cannot be readily obtained, and this apparatus will form a subject of a separate application for Letters Patent. Where this apparatus is used the same quantity of water is made to circulate through the condenser, doing duty over and over again; but where water is plentiful and a flow of cold water readily obtainable the water for condensation is simply fed to the condensers from a suitably-located tank or reservoir through the pipe H and discharged through the outlet $h^3$ and escape-pipe J.

In the case of the refrigerator shown at F, which, as stated repeatedly, does not differ in the construction of its details and appurtenances from that of the condensers D, the brine, which is to form the refrigerating or cooling medium, is fed to the refrigerators F through the feed-pipe L from a suitably-located tank or reservoir by means of a suitably-constructed pump, if necessary, in order to insure the prompt circulation of the brine, which, being fed into the refrigerator through the top opening, $h^3$, escapes through the bottom opening, $h^2$, into the pipe M, through which it is fed or distributed to the tanks in which the vessels containing the water to be converted into ice are immersed, or to any other suitable apparatus, as the case may be, according to the purpose or purposes for which our machine is to be used.

The collecting pipe or reservoir D' consists of a strong cast-iron tube or cylinder, which has a flange or collar at each end, upon which a head may be suitably packed and bolted, so that in cleaning out this tube or reservoir it is only necessary to remove one of these heads or covers, when its interior may readily be swept, washed out, or flushed with water. Another advantage of this construction is that if at any time it should be found desirable to increase the capacity of the apparatus an additional length of collecting-pipe, with its appropriate number of condensers or refrigerators, as the case may be, mounted vertically upon it, may be added without otherwise disturbing the apparatus.

Each of the flanged necks $D^3$ of the collecting-reservoir or receiving-tube D' is provided with a device by means of which the outlet of the condenser into the reservoir below can be shut off at will. This consists simply of a ball-valve, K', which is secured upon a spindle, $K^2$, which can be screwed up or down in the usual manner. The valve, when closed, bears against an annular valve-seat in the upper part of the neck and the spindle $K^2$ passes through a double stuffing-box, $K^3$, which should be packed very tight.

In Fig. 24 we have shown a further method of providing against leakage of the refrigerating agent by covering the end of the spindle, where it projects through the stuffing-box, with a cap, $K^4$. Each inlet and outlet $h^2$ and $h^3$ of the casing D of the condenser or casing F of the refrigerator, as the case may be, is connected by means of suitably-constructed valves or stop-cocks with its proper feed-pipe, H or L, so that the water-connection in the case of the condenser and brine-connection in case of the refrigerator can be shut off at will, so that each section of the condenser (or refrigerator) can be completely isolated from the remaining sections of its appropriate series.

Should at any time a leak occur, it may readily be located by isolating in succession each section of the condenser or refrigerator, as the case may be. When the section in which the leak occurs has been discovered it can be easily shut off, detached and removed, and if a spare section is kept in reserve (a precaution which should always be observed) it can be replaced at once and without loss of time. The faulty section can be placed aside, out of the way, to be repaired at leisure, and will then constitute in its turn the reserve section.

It will be observed that the construction of this part of the machine, as a whole, is such that it can be readily taken apart for inspection and repair.

In this class of machines, in which the refrigerating action depends upon the vaporization of a liquid in one vessel and its recondensation in another vessel, it is a matter of great importance that the liquid should be supplied to the refrigerating apparatus in such a manner that a constant fixed temperature may be maintained, because the rate at which the liquid vaporizes or assumes a gaseous form varies with the rapidity with which the necessary heat is supplied, and also with the rate at which the gas, after vaporization, is drawn off by the pump.

The only method of maintaining a constant fixed pressure in the refrigerating apparatus in which the liquid is vaporized is to vary the amount of the liquid supplied from time to time. Unless this can be done automatically this operation necessitates the constant attention of an attendant for the purpose of properly regulating the supply of liquid to the refrigerator. We are well aware, however, that automatic regulators have been used before in combination with the refrigerators of refrigerating and ice machines; but all with which we are acquainted require for their action that the valve regulating the inflow should be actuated directly by the pressure of the gas in the refrigerator. Our automatic apparatus controls the connection of the distributing-reservoir of the refrigerator F with the collecting-reservoir of the condenser D by means of the pressure in the inlet-pipe G of the pump, which is the same as that of the refrigerator. This connecting-pipe is indicated by the letter $G'$ in Figs. 1 and 2 of the drawings, and is connected with the outlet at one end of the collecting-reservoir $D'$, which said outlet is indicated by the letter $H'$ in Figs. 18 and 19.

Before describing in detail the construction and operation of our automatic device, it may not be out of place to point out the defects in this apparatus as heretofore constructed, prior to our improvement of the same. These defects arise from the necessity of packing the valves very tightly in order to prevent leakage of the refrigerating medium, and the pressure of the gas, where the operation of this device depends upon the direct pressure of the gas only, is not always sufficient to actuate the valve-stems through their tightly-packed stuffing-boxes, and it follows that the valves are not always opened or closed with the regularity and precision without which the inlets cannot be properly controlled. Our improvement is intended to obviate this difficulty by providing for the opening and closing of the inlet-valves by means of some external force or power, which is put in and out of gear by means of the variation of the pressure which exists within the refrigerating apparatus with which this device is connected. In this manner the pressure of the gas simply operates to put this external force by which the valves are actuated into operation, but does not in itself operate the valves, which by this construction are rendered very sensitive in their action, thus insuring perfect regularity in their working, irrespective of the amount of pressure within the refrigerators.

Figure 28:
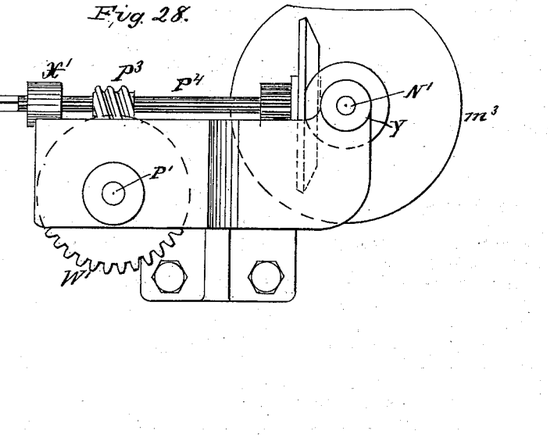
Fig. 28 is a side view of the automatic regulating device.
Figure 29:
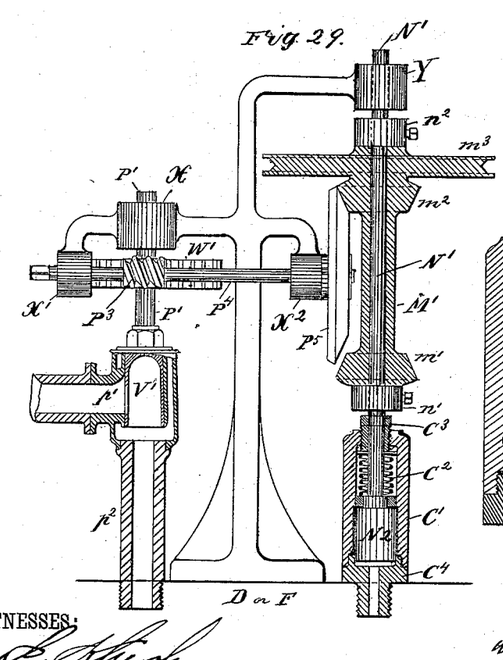
Fig. 29 is a sectional view of the same.
Figure 30:
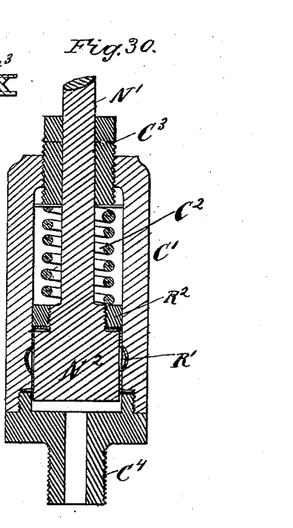
Fig. 30 is a detail view of part of the same.

This apparatus is shown at P on Figs. 1 and 2 of the drawings, and in detail on Sheet 9, on which Fig. 28 represents a side elevation of the apparatus. Fig. 29 is a plan or top view of the same, partly in section; and Fig. 30 is a sectional detail view, on an enlarged scale, of part of the apparatus.

Reference being had to these several figures, the letter $p'$ designates the inlet to a valve-chamber, within which works a valve, $V'$, of any suitable construction, a branch pipe, $p^2$, leading from the valve-chamber into the refrigerator.

$P'$ is the valve-stem, the outer end of which is journaled in a bearing, X, which forms part of a suitably-constructed frame or support. Upon the valve stem or spindle $P'$ is fixed a worm-wheel, $W'$, which meshes with a worm, $P^3$, upon a shaft, $P^4$, which is journaled at right angles to the valve-spindle $P'$ in bearings shown at $X'$ and $X^2$. At the outer end of the shaft $P^4$ is fixed a frictional bevel-wheel, $P^5$.

The letter $N'$ designates a shaft or spindle, the outer end of which rests in the bearing shown at Y, while its inner end is inserted through a screw-threaded collar (shown at $C^3$) into a cylinder, $C'$, the lower end of said spindle $N'$ forming a piston or plunger, $N^2$, the detailed construction of which will be more fully described hereinafter. Encircling that part of the stem or spindle $N'$ which works within the cylinder $C'$ is a spiral or volute spring, (shown at $C^2$,) said spring being confined between the screw-collar $C^3$ and the top of the plunger $N^2$. While the spindle $N'$ is free to move in the direction of its length in its bearings Y and C³, it is prevented from turning or rotating in them by any suitable means, such as by grooving said parts of the spindle and inserting a pin through the bearings, with its inner end projecting into said grooves, or by any other suitable expedient. Upon this spindle N' works loosely a sleeve, M', which is provided with a right and a left hand bevel-wheel, (shown at $m'$ and $m^2$,) and also with a grooved pulley, $m^3$. This sleeve, with its appurtenances, may be adjusted upon the spindle N' and fixed in any given position by means of the collars $n'$ and $n^2$, which are provided with set-screws, the inner ends of which bear against spindle N'. The lower or inner end of the cylinder C' communicates with the refrigerator, within which equilibrium is to be established. The outer end of the spindle P⁴ is made square to permit of it being turned by hand by means of a suitable key, spanner, or hand-wheel.

The action of this device is as follows, (the grooved pulley $m^3$ being connected with the motive power of the machine by an endless band, so as to cause it and the sleeve M' to rotate at a certain uniform speed:) Assuming it is required to maintain a constant pressure of, say, thirty pounds to the square inch in the refrigerator, the spring C² is adjusted by means of the screw-cap C³ until its tension is equivalent to a pressure of thirty pounds per square inch on the area of the piston or plunger N²—that is to say, by screwing down the cap the spring is contracted or compressed so as to bear against the piston with a pressure which will balance a pressure equal to thirty pounds per square inch on the area of the under side of the piston. This having been done, the sleeve M' is so adjusted upon its shaft or spindle N' by means of the adjusting-collars $n'$ and $n^2$ that both bevel-wheels $m'$ and $m^2$ shall be equidistant from the bevel-wheel P⁵ at the inner end of spindle P⁴, no frictional contact existing between them, and this relative position will be maintained when the plunger N² is in equilibrium—that is to say, when the gas-pressure on its under side is equal to the spring-pressure on its upper side. If the pressure in the refrigerator increases, the piston N², and with it the spindle N', is pushed outward, and the beveled wheel $m'$ is put into frictional contact with the large bevel-wheel P⁵. The motion transmitted through the shaft P⁴ and worm P³ turns the worm-wheel W' and closes or partially closes the inlet $p'$ by the rotation of valve V' until, the pressure being reduced, the beveled wheel $m'$ is by the action of spring C² drawn out of contact with wheel P⁵ by the return of the plunger to its normal position within cylinder C'. If the pressure falls below thirty pounds, the tension of the spring pushes the beveled wheel $m^2$ into frictional contact with the large bevel-wheel P⁵, and the motion transmitted to the valve V' through the worm-wheel W' is now in the opposite direction and tends to open the valve until the pressure against plunger N² is again equalized and the plunger returned to its normal position.

In the enlarged sectional view shown in Fig. 30 we have shown the method of providing against leakage of the gas which works the plunger, and at the same time securing free motion of the plunger inside of its cylinder without any appreciable friction. From this it will be seen that the plunger is of smaller diameter than the cylinder within which it works, so as to admit of the insertion of a piece of rubber tubing, R', between them, the upper edge of which is bent in over the top of the plunger, and held in place thereon by a screw-collar, R², which forms part of the piston, and clamps the overturned edge of the rubber tubing down upon the annular shoulder of the piston, while the lower edge of the rubber tubing is turned outwardly and clamped or fixed between an annular offset in the inner end of cylinder C' and the screw-threaded collar C⁴, by means of which the cylinder is connected to the refrigerator. Thus it will be seen that this rubber tubing, which encircles the plunger, forms practically a diaphragm, which effectually prevents the escape of gas, and the motion of the piston or plunger is between such narrow limits that the rubber is never unduly stretched.

We are aware that in machines of this class pumps have been used for forcing the refrigerating agent, in which is combined with the pump-cylinders a chamber closed to the atmosphere, which surrounds and contains the piston-rods of the pumps, and receives and holds whatever matter may escape from that end of the pump-cylinders through which the piston-rods work. We are also aware that it has been customary to cool off the pump-cylinders by means of water-jackets enveloping the same and provided with suitable inlets and outlets; and in the gas-condensers of this class of apparatus or machines we are aware that the gas pipes or tubes have been inclosed in other tubes or flues, forming a double flue, by which the body of gas or vapor, as it passes through the tubes, is divided into two columns of unequal temperature, and therefore of unequal density. We desire it understood, however, that we do not restrict ourselves to the precise construction of the apparatus as shown, for it may with advantage be modified to suit different conditions without in any essential part deviating from the spirit of our invention.

Having thus fully described our invention, we claim and desire to secure by Letters Patent of the United States—

1. In a refrigerating-machine or ice-machine, a set or series of condensers communicating with the gas-pump, and mounted vertically upon a common collecting pipe or reservoir in such a manner that each separate condenser may be isolated from the collecting pipe or reservoir, from the other condensers in the same set or series, and from the feed-pipe by which the gas to be condensed is distributed from the pump to the set or series of condensers, substantially as and for the purpose shown and set forth.

2. In a refrigerating-machine or ice-machine, a set or series of refrigerators communicating with the condensing apparatus and with a gas-pump, and mounted vertically upon a common collecting pipe or reservoir in such a manner that each separate refrigerator may be isolated from the collecting pipe or reservoir, from the other refrigerators in the same set or series, and from the feed-pipe by which the liquefied gas fed to the refrigerator for the purpose of cooling the refrigerating medium contained in the same is distributed from the pump and condensers to the set or series of refrigerators, substantially as and for the purpose shown and set forth.

3. The construction and relative arrangement, in a refrigerating-machine or ice-machine, of the motor, the pump, the feed-pipe E, the set or series of condensers communicating with said feed-pipe and provided with stopcocks E', the horizontal collecting pipe or reservoir D', connecting said condensers, means for isolating said condensers from the horizontal pipe or reservoir D', a feed-water pipe for supplying condensing-water to the condensers, a discharge-pipe for the same, and a device for automatically equalizing the gas-pressure within the refrigerators, consisting of a valve operated by the motor which works the machine, or an independent motor, said motor being thrown into or out of connection with the valve by a plunger actuated by the gas-pressure, substantially in the manner and for the purpose herein shown and set forth.

4. In a refrigerating-machine or ice-machine, the combination of the casing B, enveloping the pump-cylinders, and having a cap or cover, c, forming, with casing B, reservoirs adapted to contain a lubricating-fluid surrounding the top part of the several pump-cylinders, triplicate pump-cylinders a and their appropriate followers, crank-shaft T, located horizontally below and in a line with the set or series of pump-cylinders, lower casing, B', forming bearings for the crank-shaft, and adapted to contain a lubricating-liquid into which the cranks will dip at the revolutions of the shaft, and means for maintaining circulation of the lubricating-fluid between the lower casing, B', and the reservoirs in the upper part of the top casing, B, substantially as and for the purpose shown and set forth.

5. A gas-pump for refrigerating-machines and ice-machines, in which the pump-cylinders are contained within a casing forming jackets or chambers which envelop and separate the several cylinders, the upper parts of said jackets forming reservoirs adapted to contain a lubricating-fluid surrounding the top part of the several pump-cylinders, substantially as and for the purpose herein shown and described.

6. In a pump for refrigerating-machines or ice-machines, the combination of the upper casing, B, constructed with a reservoir adapted to contain a lubricating-fluid in its top part, surrounding the top part of the several pump-cylinders which form part of said casing, the lower casing, B', forming a support or bed for the top casing, B, and constituting a tank or reservoir for lubricating-fluid, the pump S, located within and at the bottom of said tank or reservoir, means for operating said pump, and a pipe, s, communicating at its lower end with the pump and at its upper end with the reservoir for the lubricant, located in the top part of the upper casing, B, so as to feed the lubricating-fluid from the reservoir at the bottom of the pump to that located in the top part of the same, substantially in the manner and for the purpose herein shown and described.

7. In a pump for refrigerating-machines or ice-machines, the combination of the upper casing, B, and pump-cylinders a, open at the top and bottom, with the cover c, having the outlet f, and provided with the pockets or cylinders o, projecting down into the several pump-cylinders a, substantially as and for the purpose shown and specified.

8. In a pump for refrigerating-machines or ice-machines, the combination of the following elements: a pump-cylinder open at its top and bottom and having a series of apertures encircling its upper end, a reciprocating piston or plunger having a suitably-constructed valve for feeding gas into the pump-cylinder on its downstroke, a cylindrical valve inserted into and covering the open top of the cylinder, and closing, when on its seat in its down position, the outlets or apertures i, a fluid-receptacle located around the top part of the cylinder, below its apertures i, and an elastic buffer or cushion projecting centrally down into the cylindrical valve and controlling or limiting its upward throw, all constructed, combined, and arranged to operate substantially as and for the purpose herein shown and described.

9. The combination of the pump-cylinder a, having the follower k, provided with valve w, constructed and arranged substantially as described, cylindrical valve V, having the inside packing-rings, $n^3$, outside annular recess, m, and flange n, elastic packing $n^4$, inserted between the top rim of the pump-cylinder and the bottom of the annulus m, cylindrical pocket o, and elastic buffer or cushion p, inserted into said pocket and extending below the same, substantially as and for the purpose herein shown and specified.

10. The valve V, constructed with the annulus m, cylindrical flange n, and inside packing-rings, $n^3$, substantially as shown and described.

11. In a pump for refrigerating-machines or ice-machines, the plunger or follower composed of the following elements: a cylindrical body, k, closed at top with a plate having apertures or openings $b^3$, and provided with a central hollow boss, b', exterior packing-rings, u', interior packing-rings, a', annulus l', screws r', and valve w, having a circumferential series of apertures, v', and central stem, $b^2$, inserted into the tubular boss b' of the plunger, and provided with a collar at its lower end to confine the upward motion of the valve, all constructed and combined substantially as and for the purpose herein shown and specified.

12. The combination, with the pump-cylinder $a$, of the piston or follower composed of the cylindrical body $k$, closed at top with a plate having apertures or openings $b^3$, and provided with a central hollow boss, $b'$, having a rubber packing-ring at its upper end, said plunger or follower having the exterior packing-rings, $u'$, interior packing-rings, $a'$, annulus $l'$, screws $r'$, and valve $w$, provided with circumferential apertures $v'$, and having a central stem inserted into the tubular bushing $b'$ of the plunger, the whole constructed and combined substantially in the manner and for the purpose shown and described.

13. In a refrigerating-machine or ice-machine, an injecting device adapted to spray atomized liquid into a jacket or casing enveloping the pump-cylinder, in combination with a relief-valve so constructed as to allow the expanded gas formed in the jacket to escape at a given fixed pressure, corresponding to the degree of temperature which it is desired to maintain in the pump-jacket, substantially as and for the purpose herein shown and set forth.

14. The injecting and atomizing device composed of the barrel 4, having an annular flange at its inner end, the apertured disk 1, the cylindrical plug 2, having a central channel extending longitudinally from end to end and intersected at right angles by the cross-channel 6, and screw-cap 3, the whole constructed and combined as and for the purpose herein shown and specified.

15. The combination, with the water-jacket $b$ of pump-cylinder $a$, of the injecting and atomizing device consisting of the barrel 2, having an inlet, 5, at right angles to the bore of the barrel, and an annular flange at its inner end, atomizing-disk 1, plug 2, having a longitudinal central bore, and a channel, 6, intersecting said bore at right angles, and the screw-cap 3, inserted into the rear end of the barrel, all constructed and combined substantially as and for the purpose shown and specified.

16. The combination of the water-jacket $b$ of the pump-cylinder $a$, said jacket being provided with an injector, and the relief-valve 9, constructed and arranged substantially as and for the purpose shown and described.

17. A condensing apparatus for refrigerating and ice machines, consisting of a cylindrical casing, D, a series of vertical tubes or flues, T', inserted into the top and bottom plates, D$^4$ and D$^5$, of the casing D, and communicating at the top and bottom with gas-chambers formed by the top and bottom covers, D$^6$ and D$^7$, said gas-chambers being provided with suitably-arranged inlets and outlets, and the casing being similarly provided with inlets and outlets for the water of condensation at the top and bottom thereof, the lowermost gas-chamber communicating with a reservoir or collecting-pipe for the liquefied vapor, and with a valve regulating the flow of the same from the condenser into the receiver or reservoir, substantially as and for the purpose herein shown and set forth.

18. In a condensing apparatus for refrigerating-machines or ice-machines, the gas-flues composed each of an exterior vertical tube, T', and an interior concentric tube, T$^2$, connected to the outer tube by top and bottom collars, $t'$ and $t^2$, both tubes being open at the top and bottom and connecting the top and bottom plates or heads of the condensing chamber or vessel, substantially as and for the purpose herein shown and specified.

19. The combination, with the cylindrical body or casing D of the condensing apparatus of a refrigerating-machine or ice-machine, of the convex cap or top cover, D$^6$, having a central flanged inlet, and held in place removably upon the cylindrical body D by nutted bolts D$^{10}$, and the flanged ring or annulus D$^3$, seated upon and bearing against the gasket D$^9$, substantially as and for the purpose herein shown and described.

20. The combination, with the gas-condensing apparatus, consisting essentially of the cylindrical casing D, vertical flues T', top plate, D$^4$, bottom plate, D$^5$, convex top cover, D$^6$, and convex bottom cover, D$^7$, of the reservoir or collecting-pipe D', having flanged necks D$^3$, forming seats for the superimposed apparatus, and also seats for the valve which connects the condensing apparatus with the reservoir or collecting-pipe below, substantially as herein shown and set forth.

21. In a refrigerating-machine or ice-machine, the horizontal reservoir or collecting-pipe D', mounted upon suitable feet or supports, D$^2$, and having flanged necks D$^3$, substantially as and for the purpose shown and described.

22. In a refrigerating-machine or ice-machine, the horizontal reservoir or collecting-pipe D', forming seats for and connecting with a set or series of condensers, and provided with valves K', having spindles K$^2$, working through stuffing-boxes K$^3$ on the under side of the reservoir, substantially as and for the purpose herein shown and described.

23. The combination of the reservoir or collecting-pipe D', valve K', having central threaded stem or spindle, K$^2$, working through the stuffing-box K$^3$, and the removable cap K$^4$, closing the lower open end of the stuffing-box and covering the lower end of the valve stem or spindle, substantially as and for the purpose herein shown and described.

24. The combination of the inlet-pipe $p'$ $p^2$, valve V', having valve-stem P', provided with the worm-wheel W', spindle P$^4$, having the worm P$^3$, and beveled wheel P$^5$, sliding sleeve M', provided with the beveled wheels $m'$ $m^2$ and grooved pulley $m^3$, adjusting-collars $n'$ and $n^2$, spindle N', adapted to slide in the direction of its length in its bearings, and provided at its lower end with a plunger, N$^2$, cylinder C′, coiled spring C², and screw-collar C³ for adjusting the tension of said spring, all constructed and combined to operate substantially in the manner and for the purpose herein shown and set forth.

25. The combination, with the cylinder C′ and its plunger N², of the rubber tubing R′, fastened at its lower end to the walls of the cylinder, and at its upper end to the top part of the plunger, so as to expand or contract with the motions of the same, substantially as and for the purpose herein shown and specified.

26. The combination of the plunger N², having stem N′, cylinder C′, coiled spring C², and screw-cap C³, encircling the plunger-stem and bearing with its lower end against the coiled spring C², substantially as and for the purpose herein shown and described.

27. The combination, with the spindle N′ and its sliding sleeve M′, of the collars $n'$ and $n^2$, provided with set-screws for fixing them in their adjusted position upon the spindle, substantially as and for the purpose herein shown and described.

In testimony that we claim the foregoing as our own we have hereunto affixed our signatures in presence of two witnesses.

WILLIAM H. WOOD.
GEORGE RICHMOND.

Witnesses:
S. FEUCHTWAUGER,
HENRY E. KLUGH.